United States Patent [19]

Sargis et al.

[11] Patent Number: 5,596,436
[45] Date of Patent: Jan. 21, 1997

[54] SUBCARRIER MULTIPLEXING WITH DISPERSION REDUCTION AND DIRECT DETECTION

[75] Inventors: Paul D. Sargis, Modesto; Ronald E. Haigh, Tracy; Kent G. McCammon, Livermore, all of Calif.

[73] Assignee: The Regents of the University of California, Oakland, Calif.

[21] Appl. No.: 502,732

[22] Filed: Jul. 14, 1995

[51] Int. Cl.⁶ .................................. H04J 14/02
[52] U.S. Cl. ..................... 359/132; 359/125; 359/179
[58] Field of Search ............................. 359/132, 124, 359/125, 160, 179

[56] References Cited

U.S. PATENT DOCUMENTS

| | | | |
|---|---|---|---|
| 4,953,156 | 8/1990 | Olshansky et al. | 359/132 |
| 4,989,200 | 1/1991 | Olshansky et al. | 359/132 |
| 5,107,360 | 4/1992 | Huber | 359/124 |
| 5,134,509 | 7/1992 | Olshansky et al. | 359/132 |
| 5,153,762 | 10/1992 | Huber | 359/125 |
| 5,210,631 | 10/1992 | Huber et al. | 359/132 |
| 5,432,632 | 7/1995 | Watanabe | 359/191 |

OTHER PUBLICATIONS

Sato et al, "Fiber Optic Analog–Digital Hybrid Signal Transmission Employing Frequency Modulation", IEEE Trans. on Communication vol. Com–33, No. 5 May 1985 pp. 433–441.
Olshansky, "Subcarrier Multiplexed Broadband Service Network: A Migration Path to BIDN", IEEELCS Aug. 1990 pp. 30–34.
P. A. Greenhalgh, Optical prefiltering in subcarrier systems, SPIE vol. 1790, Analog Photonics, pp. 76–84 (1992).
P. M. Hill and R. Olshansky, 8 Gb/s Subcarrier Multiplexed Coherent Lightwave System, IEEE Photonics Technology Letters, vol. 3, No. 8, pp. 764–766 (Aug., 1991).
P. Hill and R. Olshansky, Bandwidth Efficient Transmission of 4 Gb/s on two Microwave QPSK Subcarriers Over a 48 km Optical Link, IEEE Photonics Technology Letters, vol. 2, No. 7, pp. 510–512 (Jul., 1990).

*Primary Examiner*—Wellington Chin
*Assistant Examiner*—Rafael Bacares
*Attorney, Agent, or Firm*—Henry P. Sartorio; Richard B. Main

[57] ABSTRACT

An SCM system for simultaneously reducing the concomitant problems of receiver complexity and dispersion penalty and without requiring the use of an expensive, high-bandwidth optical detector. The system provides both a dispersion reduction and a direct detection to the receiver, with microwave mixers and lithium niobate external modulators that produce sidebands that are only separated by a few gigahertz from a principal laser optical carrier. Digital data streams are independently impressed upon these sidebands for transmission over an ordinary single-mode fiber. Independent high-speed data streams are upconverted to microwave frequencies. These subcarriers are then combined with a microwave power combiner and amplified with a microwave amplifier. A solid-state 1550-nm laser carrier is modulated by the microwave subcarriers. An erbium-doped fiber amplifier (EDFA) is used just prior to long-distance transmission over ordinary single-mode fiber. The transmitted optical signal may then traverse multiple EDFAs to compensate for long-haul optical fiber losses prior to detection. At a receiving end, the optical signal is split into multiple paths. The subcarrier channels are optically pre-selected using a narrowband optical filter, such as a fiber Fabry-Perot (FFP) filter. An optical detector converts the selected optical signal into a baseband electrical data stream.

11 Claims, 2 Drawing Sheets

SUBCARRIER MULTIPLEXING WITH DISPERSION REDUCTION AND DIRECT DETECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to electronic communication technology and more particularly to fiber optic systems with modulation of the light carriers with microwave frequencies for single-mode fibers.

2. Description of Related Art

Fiber-optic networks demand transmission methods that offer flexibility and the efficient exploitation of bandwidth of existing network assets, such as existing conventional single-mode fiber. Wavelength-division multiplexing (WDM) has been successfully used to transmit multiple optical carriers on a single fiber. Subcarrier multiplexing (SCM) is one of the few techniques that can accommodate the multi-format array of transmission protocols and modulation formats expected to be carried on networks. SCM can be combined with WDM to greatly increase the transmission capacity of a single fiber.

One challenge to the implementation of SCM has been the limitation on transmission distance. Normally, operation with laser light carrier wavelengths of 1550 nm permits the use of erbium-doped fiber amplifiers (EDFAs) to overcome transmission loss, but the dispersion-limited maximum transmission distance of an SCM system is dependent on its total modulation bandwidth.

Another traditional drawback to SCM has been the complexity of demodulation schemes. Hill and Olshansky demonstrated SCM using coherent detection, but this technique is too impractical to use in a telecommunications environment, and downconversion of microwave subcarriers requires phase matching to the transmitter. (P. Hill, et al., "Bandwidth Efficient Transmission of 4 Gb/s on Two Microwave QPSK Subcarriers Over a 48 km Optical Link", IEEE Photonics Technology Letters, vol. 2, no. 7, July 1990, pp. 510–512; and P. Hill, et al., "8 Gb/s Subcarrier Multiplexed Coherent Lightwave System", IEEE Photonics Technology Letters, vol. 3, no. 8, August 1991, pp. 764–766.)

Although numerous experimental high-speed SCM systems have been demonstrated, the technology has not been embraced by the telecommunications industry. Ordinary single-mode fibers have been installed all over the world, and conventional long-haul fiber systems have thus far relied on dispersion-shifted fiber in answer to the dispersion problem that accompanies carrier wavelengths of 1550 nm. Typical SCM systems have receivers that use coherent detection. Greenhalgh, et al., demonstrated an optical pre-filtering technique for subcarrier demultiplexing in a low bandwidth SCM link but did not explain how that could be used to reduce the effects of dispersion. (P. A. Greenhalgh, et al., "Optical prefiltering in subcarrier systems", SPIE, vol. 1790, Analog Photonics (1992), pp. 76–84.)

SUMMARY OF THE INVENTION

An object of the present invention is to provide an optical fiber communication system.

A further object of the present invention is to provide a subcarrier multiplexing system for long-haul communication.

Another object of the present invention is to provide a subcarrier multiplexing system for simplified receiver construction.

Briefly, a subcarrier multiplexing system embodiment of the present invention provides for the simultaneous reduction of the concomitant problems of receiver complexity and dispersion penalty and without requiring the use of an expensive, high-bandwidth optical detector. The system provides both a dispersion reduction and a direct detection to the receiver, with microwave mixers and lithium niobate external modulator that produce sidebands that are only separated by a few gigahertz from a principal laser optical carrier. Digital data streams are independently impressed upon these sidebands for transmission over an ordinary single-mode fiber. Independent high-speed data streams are upconverted to microwave frequencies. These subcarriers are then combined with a microwave power combiner and amplified with a microwave amplifier. A solid-state 1550-nm laser carrier is externally modulated by the microwave subcarriers. An erbium-doped fiber amplifier (EDFA) is used just prior to long-distance transmission over ordinary single-mode fiber. The transmitted optical signal may then traverse multiple EDFAs to compensate for long-haul optical fiber losses prior to detection. At a receiving end, the optical signal is split into multiple paths. The subcarrier channels are optically pre-selected using a narrowband optical filter, such as a fiber Fabry-Perot (FFP) filter. An optical detector converts the selected optical signal into a baseband electrical data stream.

An advantage of the present invention is that a subcarrier multiplexing system is provided that is capable of transmitting multiple 2.5 Gbit/s (OC-48) data streams over an estimated 650 km of ordinary single-mode fiber without significant dispersion, and it is estimated that 622 Mbit/s (OC-12) data streams could be transmitted over 10,000 km of fiber.

Another advantage of the present invention is that a subcarrier multiplexing system is provided that does not require the use of an expensive, high-bandwidth optical detector.

A further advantage of the present invention is that a subcarrier multiplexing system is provided that reduces dispersion and allows direct detection at the receiver. Microwave mixers and lithium niobate external modulator are used that produce sidebands that are only separated by a few gigahertz from the principal laser optical carrier.

DETAILED DESCRIPTION OF THE INVENTION

Figure 1:
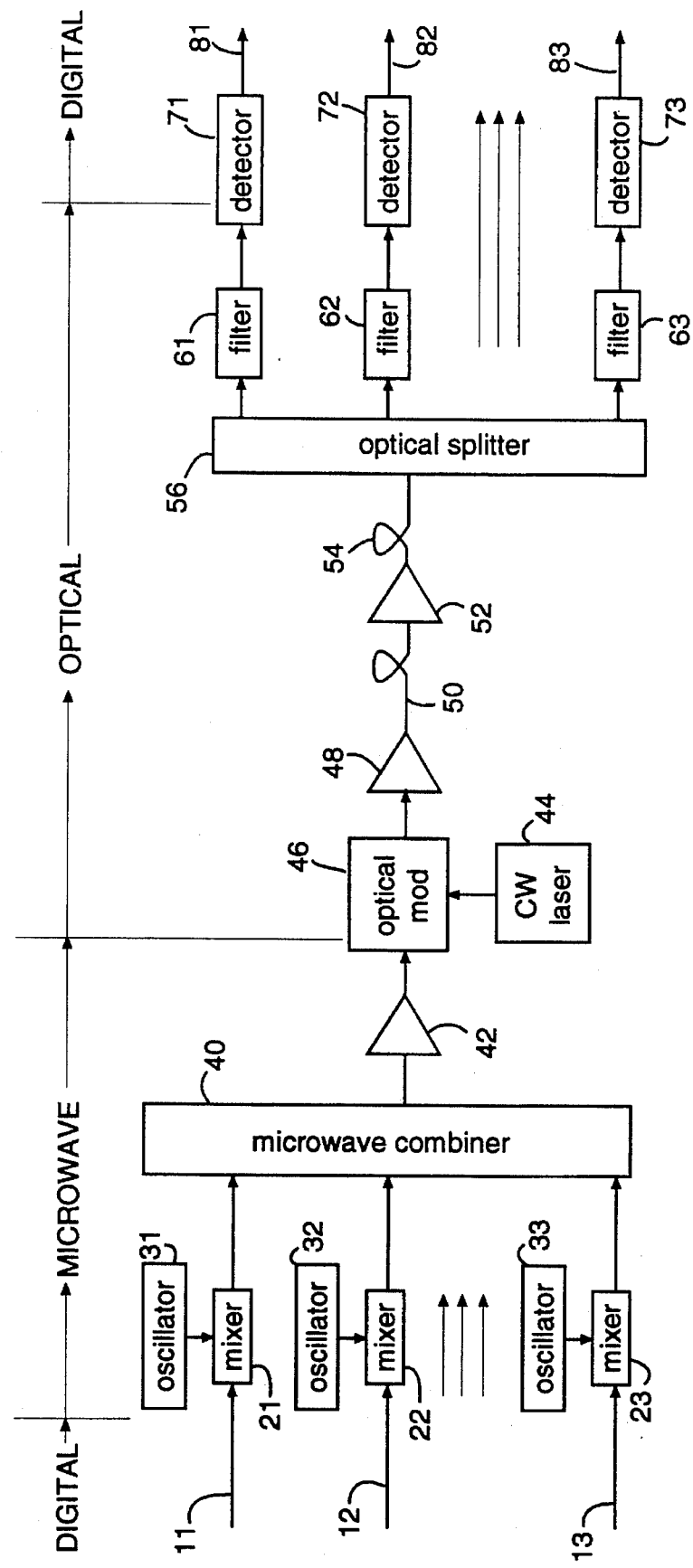
FIG. 1 is a block diagram of the subcarrier multiplexing system embodiment of the present invention.

FIG. 1 represents a subcarrier multiplexing (SCM) system for simultaneously reducing the concomitant problems of receiver complexity and dispersion penalty, such embodiment of the present invention is referred to herein by the general reference numeral 10. The SCM 10 accepts a number of digital data streams 11–13 that are independently impressed upon carrier sidebands by a corresponding set of microwave modulators 21–23 driven by respective microwave oscillators 31–33. The independent high-speed data streams 11–13 are upconverted to microwave frequencies. These subcarriers are then combined with a microwave power combiner 40 and amplified with a microwave amplifier 42. A continuous wave laser 44 produces a solid-state 1550-nm laser carrier that is modulated by the microwave subcarriers in an external optical modulator 46. An erbium-doped fiber amplifier (EDFA) 48 is used just prior to long-distance transmission over an ordinary single-mode fiber 50. The transmitted optical signal may then traverse a plurality of EDFAs 52 to compensate for long-haul optical fiber losses caused by additional lengths of ordinary single-mode fiber 54.

At a receiving end, the optical signal is split into multiple paths by an optical splitter 56. The subcarrier channels are optically pre-selected by a plurality narrowband optical filters 61–63, such as a fiber Fabry-Perot (FFP) filter. A set of corresponding optical detectors 71–73 convert the selected optical signals into a respective set of baseband electrical data streams 81–83.

When a tunable filter is used to select a particular subcarrier and associated data sidebands, the passband energy is detected with a photodiode that reproduces the original baseband information. The filter blocks the energy from optical subcarriers such that the photodiodes each appear to be illuminated by a single intensity modulated signal. So the baseband information is directly detected. The photodetector and the later signal processing stages need only to be operable at baseband frequencies, not the carrier frequency.

Each of the microwave subcarriers must be amplified to a level that does not exceed the maximum power handling capability of the external modulator, e.g., to avoid damage. Excessive modulation (beyond $V\pi$) can also result in non-linear transmission. Conversely, insufficient amplification of the small signals will provide for such inadequate optical modulation of the subcarriers that the subcarriers will not rise above the noise.

A DC bias must be applied to the optical modulator 46 (e.g., a Mach-Zehnder type) to maintain its quiescent operating point at a null, in order to suppress the main optical carrier. If such null bias is not maintained, the presence of a large optical carrier at the FFP filters 61–63 will prevent the filters' controllers from locking onto the relatively small optical subcarriers.

The modulator 46 preferably has an extinction ratio of 30–40 dB. Null-biased modulators having an extinction ratio less than this can pass significant fractions of the main optical carrier and thus can cause significant crosstalk at the receiving end.

The fiber Fabry-Perot (FFP) filters 61–63 preferably have a full-width half-maximum (FWHM) bandwidth of approximately one and a half times the bit rate. For a 2.5 Gbit/s data stream, a 3.75 GHz FFP filter should be used. Wider bandwidths than this allow too much crosstalk between adjacent subcarriers. Narrower bandwidths can distort the data stream that is passed through the filters. Where necessary, additional crosstalk suppression can be obtained by including additional FFP filters in cascade.

The optical detectors 81–83 preferably have a 3-dB bandwidth of approximately 0.75 times the bit rate. Such bandwidth provides additional suppression of crosstalk from adjacent subcarriers. The Lorentzian response of the FFP filters 61–63 cannot by itself adequately reduce the crosstalk levels of adjacent channels.

Figure 2:
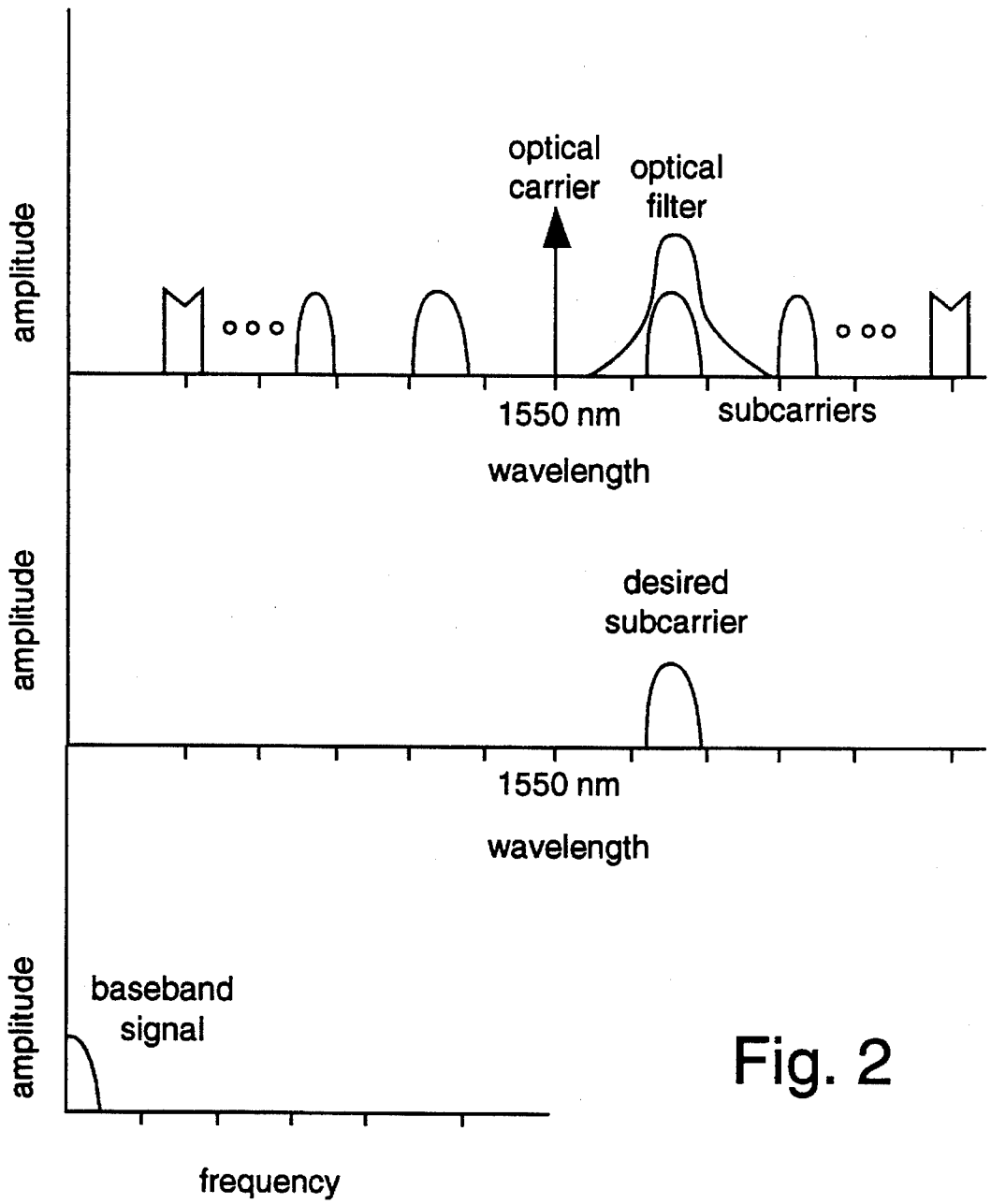
FIG. 2 illustrates various waveforms representing the signals communicated in the system of FIG. 1.

FIG. 2 illustrates various waveforms representing the signals communicated in the system of FIG. 1. The top portion represents the collection of optical subcarriers distributed about the optical carrier wavelength of 1550 nanometers, e.g., from optical modulator 46 to optical splitter 56. The middle portion represents a single "desired" subcarrier that has been selected by a filter 61–63, e.g., between filter 61 and detector 71. The bottom portion represents the baseband output of the detectors 71–73, e.g., on digital output 81.

Although particular embodiments of the present invention have been described and illustrated, such is not intended to limit the invention. Modifications and changes will no doubt become apparent to those skilled in the art, and it is intended that the invention only be limited by the scope of the appended claims.

The Invention claimed is:

1. A subcarrier multiplexing (SCM) system, comprising:
a plurality of digital bit stream inputs;
a plurality of microwave oscillators equal in number to the plurality of digital bit stream inputs and having independent and separate operating frequencies;
a plurality of microwave mixers equal in number to the plurality of digital bit stream inputs and respectively connected to provide modulated outputs from input connections from the plurality of digital bit stream inputs and plurality of microwave oscillators;
a microwave combiner connected to receive all said modulated outputs from the plurality of microwave mixers and to provide a combined microwave output;
a continuous wave (CW) laser with a laser light carrier output;
an optical modulator connected to modulate said CW laser light carrier output with a signal representing said combined microwave output;
an erbium-doped fiber amplifier (EDFA) connected to amplify said modulated CW laser light and to drive a conventional single-mode fiber optics cable; and
receiver means for connection to said conventional single-mode fiber optics cable and for recovering digital data input applied to each of the digital bit stream inputs.

2. A subcarrier multiplexing (SCM) system, comprising:
transmission means for combining the microwave outputs of a plurality of microwave mixers connected to receive digital bit stream inputs and microwave subcarriers from a corresponding plurality of microwave oscillators, and including optical modulator means for modulating a continuous wave (CW) laser light carrier output with said combined microwave subcarriers, and including an erbium-doped fiber amplifier (EDFA) connected to amplify said modulated CW laser and providing drive output for a conventional single-mode fiber optics cable;
an optical splitter for connection to said conventional single-mode fiber optics cable and for providing a plurality of separated optical subcarriers corresponding to said microwave subcarriers;
a plurality of tunable narrow-band optical filters each respectively connected to filter a single one of said plurality of separated optical subcarriers corresponding to said microwave subcarriers; and
a plurality of optical detectors each respectively connected to single ones of the tunable narrow-band optical filters and for providing a recovered signal representation of said digital bit stream inputs.

3. A subcarrier multiplexing (SCM) system, comprising:
a plurality of digital bit stream inputs;

a plurality of microwave oscillators equal in number to the plurality of digital bit stream inputs and having independent and separate operating frequencies;

a plurality of microwave mixers equal in number to the plurality of digital bit stream inputs and respectively connected to provide modulated outputs from input connection from the plurality of digital bit stream inputs and plurality of microwave oscillators;

a microwave combiner connected to receive all said modulated outputs from the plurality of microwave mixers and to provide a combined microwave output;

a continuous wave (CW) laser with a laser light carrier output;

an optical modulator connected to modulate said laser light carrier output with a signal representing said combined microwave output;

an erbium-doped fiber amplifier (EDFA) connected to amplify said modulated CW laser and to drive a conventional single-mode fiber optics cable;

an optical splitter for connection to said conventional single-mode fiber optics cable and for providing a plurality of separated optical subcarriers corresponding to said microwave subcarriers;

a plurality of tunable narrow-band optical filters each respectively connected to filter a single one of said plurality of separated optical subcarriers corresponding to said microwave subcarriers; and a plurality of optical detectors each respectively connected to single ones of the tunable narrow-band optical filters and for providing a recovered signal representation for each of said digital bit stream inputs.

4. The system of claim 3, further comprising:

an amplifier is placed between the microwave combiner and the optical modulator and is critically-adjusted in gain to produce an output signal to the optical modulator that does not exceed the maximum power handling capability of the optical modulator, and that is larger than that required for optical modulation of said subcarriers to be above the noise level.

5. The system of claim 3, wherein:

the optical modulator is a Mach-Zehnder type having a DC bias is applied to maintain a quiescent operating point at a null providing for the suppression of the main optical carrier such that the plurality of tunable narrow-band optical filters are not prevented from locking onto a relatively small optical subcarrier.

6. The system of claim 3, wherein:

the optical modulator has an extinction ratio of 30–40 dB, wherein no significant portion of optical main carrier is passed through, and providing for crosstalk reduction.

7. The system of claim 3, wherein:

the plurality of tunable narrow-band optical filters are Fabry-Perot type and each have a full-width half-maximum (FWHM) bandwidth of approximately one and one-half times the bit rate on the respective channel.

8. The system of claim 3, wherein:

the plurality of tunable narrow-band optical filters are Fabry-Perot type and each have cascaded filters providing for increased crosstalk suppression.

9. The system of claim 3, wherein:

the plurality of optical detectors each have a 3-dB bandwidth of approximately 0.75 times the corresponding channel bit rate, wherein crosstalk suppression is provided.

10. A subcarrier multiplexing (SCM) system, comprising:

a plurality of digital bit stream inputs;

a plurality of microwave oscillators equal in number to the plurality of digital bit stream inputs and having independent and separate operating frequencies;

a plurality of microwave mixers equal in number to the plurality of digital bit stream inputs and respectively connected to provide modulated outputs from input connection from the plurality of digital bit stream inputs and plurality of microwave oscillators;

a microwave combiner connected to receive all said modulated outputs from the plurality of microwave mixers and to provide a combined microwave output;

a continuous wave (CW) laser with a laser light carrier output;

an optical modulator connected to modulate said laser light carrier output with a signal representing said combined microwave output, wherein the optical modulator is a Mach-Zehnder type having a DC bias that is applied to maintain a quiescent operating point at a null providing for the suppression of the main optical carrier, and wherein the optical modulator has an extinction ratio of 30–40 dB, such that no significant portion of the optical main carrier is passed through;

an amplifier is placed between the microwave combiner and the optical modulator and is critically-adjusted in gain to produce an output signal to the optical modulator that does not exceed the maximum power handling capability of the optical modulator, and that is larger than that required for optical modulation of said subcarriers to be above the noise level;

an erbium-doped fiber amplifier (EDFA) connected to amplify said modulated CW laser and to drive a conventional single-mode fiber optics cable;

an optical splitter for connection to said conventional single-mode fiber optics cable and for providing a plurality of separated optical subcarriers corresponding to said microwave subcarriers;

a plurality of cascaded Fabry-Perot type tunable narrow-band optical filters each having a full-width half-maximum (FWHM) bandwidth of approximately one and one-half times the bit rate on the respective channel and each respectively connected to filter a single one of said plurality of separated optical subcarriers corresponding to said microwave subcarriers; and a plurality of optical detectors each respectively connected to single ones of the tunable narrow-band optical filters and for providing a recovered signal representation for each of said digital bit stream inputs, and wherein each optical detector has a 3-dB bandwidth of approximately 0.75 times the corresponding channel bit rate providing for crosstalk suppression.

11. A method for overcoming dispersion effects in the long-haul transmission of multiplexed high-speed digital data over a single-mode fiber optics cable, the method comprising the steps of:

modulating a unique microwave subcarrier frequency with a high-speed digital data stream for each of a plurality of channels;

combining the microwave energies of said plurality of said modulated subcarrier frequencies;

optically modulating a continuous wave (CW) laser with said combined modulated subcarrier frequencies;

transporting said optically-modulated CW laser with single-mode fiber optic cable and using a fiber amplifier to make up fiber cable losses;

optically splitting said optically-modulated CW laser to a plurality of tunable narrowband optical filters to select a single subcarrier for each optical filter; and detecting respective said high-speed digital data streams directly from each tunable narrowband optical filter.

* * * * *